(12) United States Patent
Mankowski et al.

(10) Patent No.: US 12,452,090 B2
(45) Date of Patent: Oct. 21, 2025

(54) METHODS AND SYSTEMS FOR OPERATING AN ELECTRIC VEHICLE

(71) Applicant: ACCELERATED SYSTEMS INC., Waterloo (CA)

(72) Inventors: Peter Mankowski, Cambridge (CA); Josh Wilson, Random Lake, WI (US)

(73) Assignee: Accelerated Systems Inc., Waterloo (CA)

(*) Notice: Subject to any disclaimer, the term of this patent is extended or adjusted under 35 U.S.C. 154(b) by 0 days.

(21) Appl. No.: 18/288,066

(22) PCT Filed: May 18, 2022

(86) PCT No.: PCT/IB2022/054626
§ 371 (c)(1),
(2) Date: Oct. 24, 2023

(87) PCT Pub. No.: WO2022/243898
PCT Pub. Date: Nov. 24, 2022

(65) Prior Publication Data
US 2024/0205034 A1 Jun. 20, 2024

Related U.S. Application Data

(60) Provisional application No. 63/190,725, filed on May 19, 2021.

(51) Int. Cl.
*H04L 12/12* (2006.01)
*B60R 16/023* (2006.01)
*H04L 12/40* (2006.01)

(52) U.S. Cl.
CPC ............ *H04L 12/12* (2013.01); *B60R 16/023* (2013.01); *H04L 12/40* (2013.01)

(58) Field of Classification Search
CPC ........ H04L 12/12; H04L 12/40; B60R 16/023
See application file for complete search history.

(56) References Cited

U.S. PATENT DOCUMENTS 7,669,202 B1 * 2/2010 Tene .................. G06F 9/547
718/1
10,002,526 B1 * 6/2018 Dyer .................. G08C 17/02
(Continued)

FOREIGN PATENT DOCUMENTS

| CN | 105681199 A | * | 6/2016 | ............. H04L 12/40 |
| CN | 108111510 A | * | 6/2018 | ............. H04W 4/48 |
| DE | 102021101173 A1 | * | 7/2022 | ............. B60D 1/06 |

OTHER PUBLICATIONS

Translation of CN-105681199-A (Year: 2016).*
(Continued)

*Primary Examiner* — Henry Tsai
*Assistant Examiner* — John B Roche

(57) ABSTRACT

There are provided methods and systems for operating electric vehicles. One example method includes generating a first digital message at a source component of the electric vehicle. The source component is connected to a first bus comprising one of a Power Communication Network bus (PCN bus) and a Vehicle Communication Network bus (VCN bus) of the electric vehicle. The PCN and VCN buses are each connected to a Vehicle Control Module (VCM) of the electric vehicle. The method also includes transmitting the first digital message from the source component to the VCM over the first bus, and generating at the VCM a second digital message based on the first digital message. In addition, the method includes transmitting the second digital message from the VCM to a destination component of the electric vehicle. The destination component is connected to a second bus comprising one of the PCN and VCN buses.

26 Claims, 6 Drawing Sheets

(56) References Cited

U.S. PATENT DOCUMENTS

| | | | |
|---|---|---|---|
| 2003/0028687 A1* | 2/2003 | Goossen | G06F 13/4095 |
| | | | 710/1 |
| 2013/0205295 A1* | 8/2013 | Ebcioglu | G06F 9/5077 |
| | | | 718/1 |
| 2018/0062988 A1 | 3/2018 | Sikaria | |
| 2023/0122499 A1* | 4/2023 | Holeton | B60L 58/20 |
| | | | 320/109 |

OTHER PUBLICATIONS

Translation of DE-102021101173-A1 (Year: 2021).*
Translation of CN-108111510-A (Year: 2018).*
Extended European Search Report dated Jun. 18, 2025, European Patent Application No. 22804164.6.

* cited by examiner

100

---

Generating a first digital message at a source component of an electric vehicle, the source component connected to a first bus comprising one of a Power Communication Network bus (PCN bus) and a Vehicle Communication Network bus (VCN bus) of the electric vehicle, the PCN and VCN buses each connected to a Vehicle Control Module (VCM) of the electric vehicle

105

---

Transmitting the first digital message from the source component to the VCM over the first bus

110

---

Generating at the VCM a second digital message based on the first digital message

115

---

Transmitting the second digital message from the VCM to a destination component of the electric vehicle, the destination component connected to a second bus comprising one of the PCN and VCN buses

METHODS AND SYSTEMS FOR OPERATING AN ELECTRIC VEHICLE

CROSS-REFERENCE TO RELATED APPLICATION

This application claims priority from U.S. Provisional Patent Application No. 63/190,725, filed on May 19, 2021, which is incorporated herein by reference in its entirety.

FIELD

The present specification relates to methods and systems for operating an electrical device, and in particular to methods and systems for operating an electric vehicle.

BACKGROUND

Some vehicles may be powered by electricity and use electric motors for actuation. Such electric vehicles may have a variety of components. These components may communicate with each other to allow the components to work together to operate the electric vehicle.

SUMMARY

According to an implementation of the present specification there is provided a method of operating an electric vehicle, the method comprising: generating a first digital message at a source component of the electric vehicle, the source component connected to a first bus comprising one of a Power Communication Network bus (PCN bus) and a Vehicle Communication Network bus (VCN bus) of the electric vehicle, the PCN and VCN buses each connected to a Vehicle Control Module (VCM) of the electric vehicle; transmitting the first digital message from the source component to the VCM over the first bus; generating at the VCM a second digital message based on the first digital message; and transmitting the second digital message from the VCM to a destination component of the electric vehicle, the destination component connected to a second bus comprising one of the PCN and VCN buses.

The PCN bus and the VCN bus may have different baud rates.

The source component may be connected to the first bus comprising one of the PCN bus and the VCN bus; and the destination component may be connected to the second bus comprising the other one of the PCN bus and the VCN bus.

A battery may be connected to the PCN bus.

The first bus may comprise the PCN bus; the source component may comprise the battery; and the generating the first digital message at the source component may comprise generating the first digital message at the battery.

A digital input device associated with the electric vehicle may be connected to the VCN bus.

An electric actuator controller of the electric vehicle may be connected to the VCN bus.

The destination component may comprise one or more of the digital input device and the electric actuator controller; and the transmitting the second digital message to the destination component may comprise transmitting the second digital message to one or more of the digital input device and the electric actuator controller.

The method may further comprise: synchronizing a baud rate of the VCM with a corresponding baud rate of the PCN bus.

The method may further comprise: coordinating at the VCM a digital message traffic over the PCN bus with a corresponding digital message traffic over the VCN bus.

The coordinating the digital message traffic over the PCN bus with the corresponding digital message traffic over the VCN bus may comprise: receiving at the VCM one or more candidate digital messages from one or more of the PCN and VCN buses, the candidate digital messages to be sent over one or both of the VCN bus and the PCN bus; and storing the candidate digital messages at the VCM in a message queue.

The method may further comprise: transmitting the candidate digital messages according to a scheme out of the message queue over one or both of the VCN bus and the PCN bus, the scheme comprising one of first-in-first-out (FIFO) and last-in-first-out (LIFO).

The method may further comprise: receiving at the VCM an acknowledgement of successful transmission of a target candidate digital message of the candidate digital messages; and removing the target candidate digital message from the message queue in response to receiving the acknowledgement.

The method may further comprise: storing at the VCM an indication of transmission of the target candidate digital message.

The coordinating the digital message traffic over the PCN bus with the corresponding digital message traffic over the VCN bus may comprise: receiving at the VCM one or more candidate digital messages to be sent over one or both of the VCN bus and the PCN bus; filtering at the VCM the candidate digital messages to generate a filtered subset of the candidate digital messages pertinent to a power component of the electric vehicle connected to the PCN bus; and transmitting one or more of the candidate digital messages in the filtered subset over the PCN bus.

According to another implementation of the present specification there is provided a system for operating an electric vehicle, the system comprising: a Vehicle Control Module (VCM) of the electric vehicle; a Power Communication Network bus (PCN bus) connected to the VCM; a Vehicle Communication Network bus (VCN bus) connected to the VCM; a source component of the electric vehicle connected to a first bus comprising one of the PCN and VCN buses, the source component to generate a first digital message, the first bus to transmit the first digital message to the VCM; the VCM to generate a second digital message based on the first digital message; and a destination component of the electric vehicle connected to a second bus comprising one of the PCN and VCN buses, the second bus to transmit the second digital message from the VCM to the destination component.

The PCN bus and the VCN bus may have different baud rates.

The source component may be connected to the first bus comprising one of the PCN bus and the VCN bus; and the destination component may be connected to the second bus comprising the other one of the PCN bus and the VCN bus.

The system may further comprise a battery of the electric vehicle connected to the PCN bus.

The first bus may comprise the PCN bus; the source component may comprise the battery; and the battery may be to generate the first digital message.

The system may further comprise a digital input device associated with the electric vehicle connected to the VCN bus.

The system may further comprise an electric actuator controller of the electric vehicle connected to the VCN bus.

The destination component may comprise one or more of the digital input device and the electric actuator controller.

The VCM may be further to: synchronize a baud rate of the VCM with a corresponding baud rate of the PCN bus.

The VCM may be further to: coordinate a digital message traffic over the PCN bus with a corresponding digital message traffic over the VCN bus.

To coordinate the digital message traffic over the PCN bus with the corresponding digital message traffic over the VCN bus the VCM may be to: receive one or more candidate digital messages from one or more of the PCN and VCN buses, the candidate digital messages to be sent over one or both of the VCN bus and the PCN bus; and store the candidate digital messages at the VCM in a message queue.

The VCM may be further to: transmit the candidate digital messages according to a scheme out of the message queue over one or both of the VCN bus and the PCN bus, the scheme comprising one of first-in-first-out (FIFO) and last-in-first-out (LIFO).

The VCM may be further to: receive an acknowledgement of successful transmission of a target candidate digital message of the candidate digital messages; and remove the target candidate digital message from the message queue in response to receiving the acknowledgement.

The VCM may be further to: store at the VCM an indication of transmission of the target candidate digital message.

To coordinate the digital message traffic over the PCN bus with the corresponding digital message traffic over the VCN bus the VCM may be to: receive one or more candidate digital messages to be sent over one or both of the VCN bus and the PCN bus; filter the candidate digital messages to generate a filtered subset of the candidate digital messages pertinent to a power component of the electric vehicle connected to the PCN bus; and transmit one or more of the candidate digital messages in the filtered subset over the PCN bus.

BRIEF DESCRIPTION OF THE DRAWINGS

Some example implementations of the present specification will now be described with reference to the attached Figures, wherein:

FIG. 1 shows a flowchart of an example method of operating an electric vehicle, in accordance with a non-limiting implementation of the present specification.

DETAILED DESCRIPTION

Figure 2:
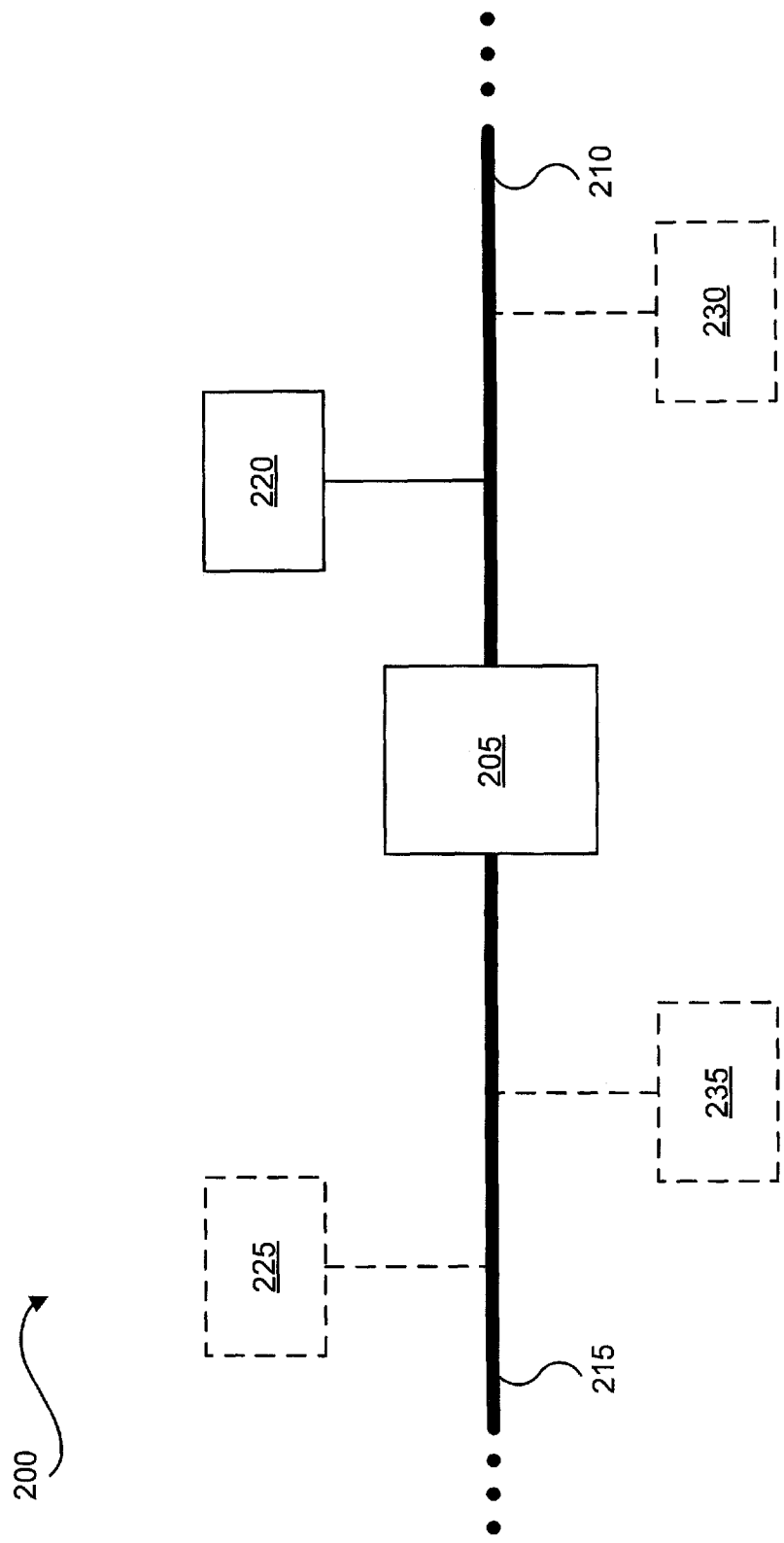
FIG. 2 shows a schematic representation of an example system for operating an electric vehicle, in accordance with a non-limiting implementation of the present specification.

Unless the context requires otherwise, throughout this specification the word "comprise" and variations thereof, such as, "comprises" and "comprising" are to be construed in an open, inclusive sense, that is as "including, but not limited to."

As used in this specification, the singular forms "a," "an," and "the" include plural referents unless the content clearly dictates otherwise. It should also be noted that the term "or" is generally employed in its broadest sense, that is as meaning "and/or" unless the content clearly dictates otherwise.

As electric energy systems (e.g. battery power) have become more common and commercially available, it is becoming possible to electrify larger more complicated devices that traditionally have been powered by internal combustion engines. As such, it is now possible to electrically power utility machines or vehicles such as ride on lawn mowers, sprayers, tillers, snow throwers, and the like. This type of vehicle may also be referred to as electric utility vehicles. In this description, electric utility vehicles may also be referred to as "electric vehicles", or as "vehicles" in short.

Electric utility vehicles that have been developed to date have had simplified controls where batteries supply energy to the motors, input devices allow the operator to control the motors, and other devices on the vehicle through analog means by flipping switches, and using analog devices to control various motor outputs that result in the operation of the vehicle according to the operator's intensions.

In order to increase the efficiency, reliability, and the range of functionalities of such electric vehicles, digital messages and signals may be used to allow the various components of the electric vehicle to communicate with one another to operate the electric vehicle. In some examples, such a utility vehicle may have a controller referred to as the Vehicle Control Module (VCM). In some examples, the VCM may be programmed to receive digital battery status from the battery on a Power Communication Network (PCN) bus, and receive digital inputs from input devices that are controlled by the operator or otherwise on a Vehicle Control Network (VCN) bus. In some examples, the Vehicle Control Module may control the entire vehicle by making decisions based on information provided from the two individual network buses and control motors and other devices on the VCN bus through digital communication, along with controlling batteries through the PCN bus.

FIG. 1 shows a flowchart of an example method 100 for operating an electric vehicle, which method uses digital messages for communication between the components of the electric vehicle. At box 105, a first digital message may be generated at a source component of the electric vehicle. The source component is connected to a first bus comprising one of a Power Communication Network bus (PCN bus) and a Vehicle Communication Network bus (VCN bus) of the electric vehicle. The PCN and VCN buses may each be connected to a Vehicle Control Module (VCM) of the electric vehicle.

The source component may be a component of the electric vehicle such as a battery, motor, motor controller, sensor, input or output terminal, and the like. The source component may be directly or indirectly connected to the first bus. The first digital message may comprise a digital data packet, and the like. The PCN and VCN buses may each comprise a bus, a conduit, a communication backbone, or the like, capable of carrying digital messages. In some examples, the PCN bus may provide the communication network between the battery and the VCM. Moreover, in some examples, the VCN bus may provide the communication network between the VCM and digital input devices and actuator controllers of the electric vehicle.

In some examples, digital input devices may include devices that receive or generate input and provide those inputs to the electric vehicle as digital inputs or digital messages. Examples of such input devices may include vehicle operator controls, sensors, and the like. Furthermore, in some examples, actuator controllers may include motor controllers, servo controllers, and the like. In addition, in some examples, the VCM may include a controller capable of receiving and sending digital messages. These messages may be sent over one or both of the PCN and VCN buses. These buses may be connected directly or indirectly to the VCM. It is contemplated that in some examples, the VCM may comprise a microprocessor in communication with a machine-readable memory. Example systems or networks formed by the VCM and the PCN and VCN buses are described further in relation to FIGS. 2 and 3.

At box 110, the first digital message may be transmitted from the source component to the VCM over the first bus. At box 115, a second digital message may be generated by the VCM based on the first digital message. In some examples the VCM may generate the second digital message by routing or re-routing the first digital message towards a destination component of the electric vehicle. This destination component may be connected directly or indirectly to a second bus comprising one of the PCN and VCN buses. Examples of the destination component may include motor controller or other actuator controllers, motors, digital output devices or terminals, and the like.

Moreover, in some examples, the VCM may modify the first digital message to generate the second digital message. In this description, the first and second digital messages may also be referred to as first and second messages in short. For example, the VCM may change the communication protocol of the second message compared to the first message if the second bus or the destination component operate using communication protocols different than those of the source component and the first bus. Other examples of modifications to generate the second messages are also contemplated, such as modifying baud rate or clock rate if the source and destinations components, or the buses to which they are connected, have different clock or baud rates.

Furthermore, in some examples, the VCM may generate the second message using the first message as a trigger or input. For example, if the first message is from the battery to indicate low charge, the VCM may then generate a second message to the motor controllers to limit maximum speed to conserve range. Other examples of the VCM generating the second message based on the first message are also contemplated.

At box 120 the second digital message may be transmitted from the VCM to the destination component of the electric vehicle. The destination component may be connected to a second bus comprising one of the PCN and VCN buses. In some examples of method 100, the source and destination components may be connected to the same one of the PCN and VCN buses. In other words, both the source and destination components may be connected to the same bus. In yet other words, in such examples the "first bus" and the "second bus" may refer to the same physical bus.

It is also contemplated that in some examples of method 100, the source and destination components may be connected to different ones of the PCN and VCN buses. In other words, the source component may be connected to one of the PCN and VCN buses and the destination component may be connected to the other one of the PCN and VCN buses. In yet other words, in such examples the "first bus" and the "second bus" may refer to different physical buses. Examples of different configurations of the source and destination components with the PCN and VCN buses are described further in relation of FIGS. 2 and 3.

Since the "first bus" and the "second bus" may refer to the same physical bus or refer to different physical buses, the "first bus" and the "second bus" may also be described as the "source component bus" and the "destination component bus" respectively. Since the source and destination components may be connected to the same physical bus or to different physical buses, the "source component bus" and the "destination component bus" may refer to the same physical bus or to different physical buses.

In some examples, the PCN and VCN buses may have different baud rates. In some such examples the VCM may synchronize its baud rate with the baud rate of one of the PCN and VCN buses. For example, the VCM may synchronize with the baud rate of the PCN to facilitate communication with the power sources and components (e.g. battery, battery management system, etc.) of the vehicle. Moreover, in some such examples where the baud rates are different and the source and destination components are on different buses, the VCM may adapt the first message arriving from a first bus with a first baud rate to form a second message capable of being communicated to the destination component via the second bus having a different second baud rate.

As discussed above, in some examples, a battery of the electric vehicle may be connected to the PCN bus. In some such examples, the first bus may be the PCN bus, the source component may comprise the battery, and generating the first digital message may comprise generating the first digital message at the battery. Examples of such a first message may include a message about the status of the battery, such as level of charge, temperature, power flowing out of or into the battery, and the like.

Moreover, in some examples, a digital input device associated with the electric vehicle may be connected to the VCN bus. This digital input device may be an input device that generates a digital input in the form of a digital message to be communicated over the VCN bus to another component of the electric vehicle, such as to the VCM. Examples of such input devices may include control instruments or input terminals for allowing an operator to operate the electric vehicle, sensors, and the like.

In addition, in some examples, an actuator controller of the electric vehicle may also be connected to the VCN bus. Examples of actuator controllers may include motor controllers, servo controllers, and the like. In some such examples, the destination component may comprise one or more of the digital input device and the electric actuator controller. The second digital message may then be transmitted to one or more of the digital input device and the electric actuator controller. In other words, in some examples, the battery connected to the PCN bus may generate a first digital message, which is then communicated by the PCN bus to the VCM. Based on this first message, the VCM may generate a second message that is communicated by the VCN bus to a destination device such as motor controller (or other types of actuator controller) and the like.

In some examples, the communication may also flow in the opposite direction from a digital input device, via the VCM, to the battery. For example, an operator may adjust the throttle, which may generate a first message communicated via the VCN bus to the VCM. The VCM may then generate a second message based on the throttle input, which second message may be sent via the PCN to the battery to control the amount of power that is to flow from or to the battery to satisfy the adjusted throttle input. In the examples provided here, the messages generated, transmitted, and exchanged are all digital messages. Furthermore, in some examples, the VCM need not receive or generate analog messages.

Moreover, in some examples, method 100 may further comprise the VCM coordinating the digital message traffic over the PCN bus with a corresponding digital message traffic over the VCN bus. In some examples, this coordination may be related to adjusting or synchronizing baud rates. Furthermore, in some examples, this coordination may be related to directing, scheduling, tracking, or prioritizing the flow of digital messages through and between the PCN and VCN buses to reduce conflicts and interference and optimize digital message traffic. An example of such coordination of digital message traffic is described further in relation to FIG. 5.

In some examples, the VCM may receive one or more candidate digital messages from one or more of the PCN and VCN buses. The candidate messages may be intended to be sent over one or both of the PCN and VCN buses. The VCM may then store the candidate digital messages in a message queue. The VCM may cause the candidate digital messages to be transmitted according to a scheme out of the message queue over one or both of the VCN bus and the PCN bus. In some examples, the scheme may comprise first-in-first-out (FIFO), last-in-first-out (LIFO), and the like.

In addition, in some examples the VCM may receive an acknowledgement of the successful transmission of a target candidate digital message of the candidate digital messages. In response to receiving this acknowledgement, the VCM may remove the target candidate digital message from the message queue. Moreover, in some examples, the VCM may store an indication of transmission of the target digital message. In some examples, this indication may be a digital flag, pointer, variable, or other indication indicating that the target digital message was transmitted, acknowledged, and removed from the message queue. In this manner, the VCM may set or control the order or scheme according to which incoming messages are transmitted out, and track which of those messages are transmitted successfully. An example of such functions is descried further in relation to FIG. 5.

In some situations, the digital input and output components of an electric vehicle may generate a number of digital messages that may use up a large portion, or substantially all of, the bandwidth of a typical bus of the electric vehicle. In such situations, the power components of the electric vehicle, such as the battery, may experience a shortage of bandwidth on the bus for the digital messages related to the operation and safety of the power components, such as digital messages related to the self-protection, power limits, and the like related to the batteries.

To address this type of bandwidth shortage, the digital input and output components may be connected to a bus separate from the bus used for the power components. For example, the digital input and output devices may be connected to the VCN bus, and the power components may be connected to the PCN bus. Examples of power components may include batteries, battery packs, battery management systems or controllers, and the like. The VCM may then filter the traffic of digital messages being transmitted over the buses to limit the digital messages on the PCN bus to those digital messages pertinent to the power components of the electric vehicle connected to the PCN.

In other words, in some examples, the VCM coordinating the digital message traffic over the PCN bus with the corresponding digital message traffic over the VCN bus may include receiving at the VCM one or more candidate digital messages to be sent over one or both of the VCN and PCN buses. The VCM may then filter the candidate digital messages to generate a filtered subset of the candidate digital messages pertinent to a power component of the electric vehicle connected to the PCN bus. Then the one or more candidate digital messages in the filtered subset may be transmitted over the PCN bus.

In this manner, the traffic on the PCN bus may be limited to the messages that are pertinent to the power components connected to the PCN bus. Such pertinent messages may include messages generated by the power components, messages intended for the power components, or messages otherwise related or relevant to the power components. Limiting the traffic on the PCN bus in this way reduces the bandwidth utilization of the PCN bus, thereby reducing the likelihood of bandwidth shortages on the PCN bus.

This type of filtering may be batch-wise or continuous. For example, batch-wise filtering may be applied to one or more messages in a message queue before those messages are transmitted over one or more of the buses of the electric vehicle. In the continuous filtering mode, each candidate message may be filtered as it arrives at the VCM: if the candidate message is determined to be pertinent to a power component, then the message is allowed to be transmitted over the PCN bus to the power components connected to the PCN bus.

Turning now to FIG. 2, a schematic representation is shown of an example system 200 for operating an electric vehicle. System 200 may have the features and perform the functions described in relation to method 100 and the other methods described herein. It is also contemplated that in some examples system 200 may have features or perform functions other than those described in relation to method 100 and the other methods described herein.

System 200 comprises a VCM 205, and a PCN bus 210 and a VCN bus 215 each connected to VCM 205. The ellipsis or three dots at the ends of buses 210 and 215 are intended to indicate that these buses may be longer than depicted, and each may have additional components attached to it. These PCN and VCN buses may be similar to the corresponding buses described in relation to method 100 and the other methods described herein. While FIG. 2 shows the PCN and VCN buses each being directly connected to VCM 205, it is contemplated that in some examples, one or more of these buses may be indirectly connected to VCM 205. In some examples, VCM 205 may comprise a processor in communication with a machine readable memory. In addition, in some examples, such a processor may comprise a central processing unit (CPU), a graphics processing unit (GPU), a microcontroller, a microprocessor, a processing core, a field-programmable gate array (FPGA), or similar device capable of executing instructions. The processor may cooperate with the memory to execute instructions.

Such a memory may comprise a non-transitory machine-readable storage medium which may comprise an electronic, magnetic, optical, or other physical storage device that stores executable instructions. The machine-readable storage medium may include, for example, random access memory (RAM), read-only memory (ROM), electrically-erasable programmable read-only memory (EEPROM), flash memory, and the like. The machine-readable storage medium may be encoded with executable instructions.

System 200 also comprises a source component 220 connected to a first bus. In FIG. 2 this first bus comprises PCN bus 210. It is also contemplated that in some examples the first bus may comprise the VCN bus 215. In other words, in some examples, the source component may be connected to the VCN bus. Component 220 may be directly or indirectly connected to bus 210. Source component 220 may be similar in structure and function to the source components described in relation to method 100 and the other methods described herein.

Source component 220 may generate a first digital message. Bus 210 may transmit that first message to VCM 205. VCM 205, in turn, may generate a second digital message based on the first digital message. The generation of the second digital message may be similar to the corresponding functionality described in relation to method 100 and the other methods described herein.

System 200 may also comprise a destination component 225, which may be directly or indirectly connected to a second bus connected to VCM 205. In FIG. 2 this second bus comprises VCN bus 215. It is also contemplated that in some examples the second bus may comprise the PCN bus 210. In other words, in some examples, the destination component may be connected to the PCN bus. The second bus may transmit the second digital message from VCM 205 to destination component 225. The structure and function of destination component 225 may be similar to the corresponding structures and functions described in relation to method 100 and the other methods described herein.

While FIG. 2 shows source component 220 and destination component 225 as being on different buses, it is contemplated that in some examples the source and destination components may be connected to the same bus. Moreover, while FIG. 2 shows source component 220 and destination component 225 being connected to PCN bus 210 and VCN bus 215 respectively, it is contemplated that in some examples, source component 220 and destination component 225 may be connected to VCN bus 215 and PCN bus 210 respectively.

In addition, in some examples, system 200 may comprise a component 230 connected to bus 210. Component 230 may be similar to component 225. In some examples, component 230 may be the destination component for the second digital message. In other words, component 220 (acting as the source) and component 230 (acting as the destination) would both be connected to the same bus 210.

It is also contemplated that in some examples system 200 may comprise multiple source or destination components connected to one or more of bus 210 and bus 215. For example, system 200 may also comprise component 235 connected to bus 215. Component 235 may be similar to components 225 and 230. In some examples, both components 230 and 235 may act as destination components. Moreover, in some examples, both components 225 and 235 may act as destination components. Furthermore, in some examples, components 225, 230, and 235 may all act as destination components. It is contemplated that in some examples, system 200 may comprise more or fewer components connected to one or both of the PCN and VCN buses than those shown in FIG. 2, and that various subsets of these components may act as one or both of source and destination components.

In some examples, the PCN bus and the VCN bus may have different baud rates. In some such examples, VCM 205 may synchronize itself with the baud rate of one of the buses. For example, VCM 205 may synchronize its baud or clock rate with the baud rate of the PCN bus. In some examples, VCM 205 may select or adjust the attributes of the second digital message so that the second message may be transmitted over the second bus and received by the destination component.

Moreover, in some examples, source component 220 may be connected to the first bus comprising one of the PCN and VCN buses. The destination component, such as component 225 or 235, may be connected to the second bus comprising the other one of the PCN and VCN buses. In other words, the source and destination components may be connected to different buses. It is also contemplated that in some examples, the source and destination components may be connected to the same bus.

Furthermore, in some examples, system 200 may comprise a battery of the electric vehicle connected to the PCN bus. For example, system 200 may comprise PCN bus 210, VCN bus 215, and source component 220 may be or comprise the battery. In some such examples, the battery may generate the first digital message. This first message, for example, may comprise information about the state of the battery such as state of charge, temperature, a measure of the power flowing into or out of the battery, and the like.

In some examples, system 200 may comprise a digital input device associated with the electric vehicle connected to the VCN bus. For example, component 225 or 235 may comprise such a digital input device. In addition, in some examples, system 200 may comprise an electric actuator controller connected to the VCN bus. Examples of such controllers may include motor controllers, servo controllers, and the like. For example, component 225 or 235 may comprise such a controller. Digital input devices and actuator controllers may be similar to those described in relation to method 100 and the other methods described herein. In some such examples, the destination component may comprise one or more of the digital input device and the electric actuator controller.

Moreover, in some examples, VCM 205 may also coordinate the digital message traffic over the PCN bus with a corresponding digital message traffic over the VCN bus. In some examples, this coordination may be related to adjusting or synchronizing baud rates. Furthermore, in some examples, this coordination may be related to directing, scheduling, tracking, or prioritizing the flow of digital messages through and between the PCN and VCN buses to reduce conflicts and interference and to optimize digital message traffic. An example of such coordination of digital message traffic is described further in relation to FIG. 5.

In some examples, VCM 205 may receive one or more candidate digital messages from one or more of the PCN and VCN buses. The candidate messages may be intended to be sent over one or both of the PCN and VCN buses. VCM 205 may then store the candidate digital messages in a message queue. VCM 205 may cause the candidate digital messages to be transmitted according to a scheme out of the message queue over one or both of the VCN bus and the PCN bus. In some examples, the scheme may comprise first-in-first-out (FIFO), last-in-first-out (LIFO), and the like.

In addition, in some examples VCM 205 may receive an acknowledgement of the successful transmission of a target candidate digital message of the candidate digital messages. In response to receiving this acknowledgement, VCM 205 may remove the target candidate digital message from the message queue. Moreover, in some examples, the VCM may store an indication of transmission of the target digital message. In some examples, this indication may comprise a digital flag, pointer, variable, or other indication indicating that the target digital message was transmitted, acknowledged, and removed from the message queue. In this manner, VCM 205 may set or control the order or scheme according to which incoming messages are transmitted successfully. An example of such functions is descried further in relation to FIG. 5.

In FIG. 2 components 225, 230, and 235 are depicted in dashed lines to indicate that in some examples system 200 need not comprise one or two of these components, or that one of more of these components may be connected to a different bus than shown in FIG. 2.

In addition, while component 220 is described as the source component and components 225, 230, and 235 are described as possible destination components, it is contemplated that in some examples, one subset of the components connected to the PCN and VCN buses may act as the source and another subset of the component connected to the PCN and VCN buses may act as destination components. For example, component 220 need not act as the source component, and one or more of components 225, 230, and 235 may act as source components.

It is also contemplated that a component that acts as one of source and destination at one time, may act as the other one of source and destination at another time. In other words, a component may change over time whether it acts as a source or a destination for digital messages. Moreover, in some examples, a given component may act simultaneously as both source and destination, for different messages. In other words, a given component may generate and act as the source of a message, while simultaneously receiving and acting as the destination for another, different message.

Figure 3:
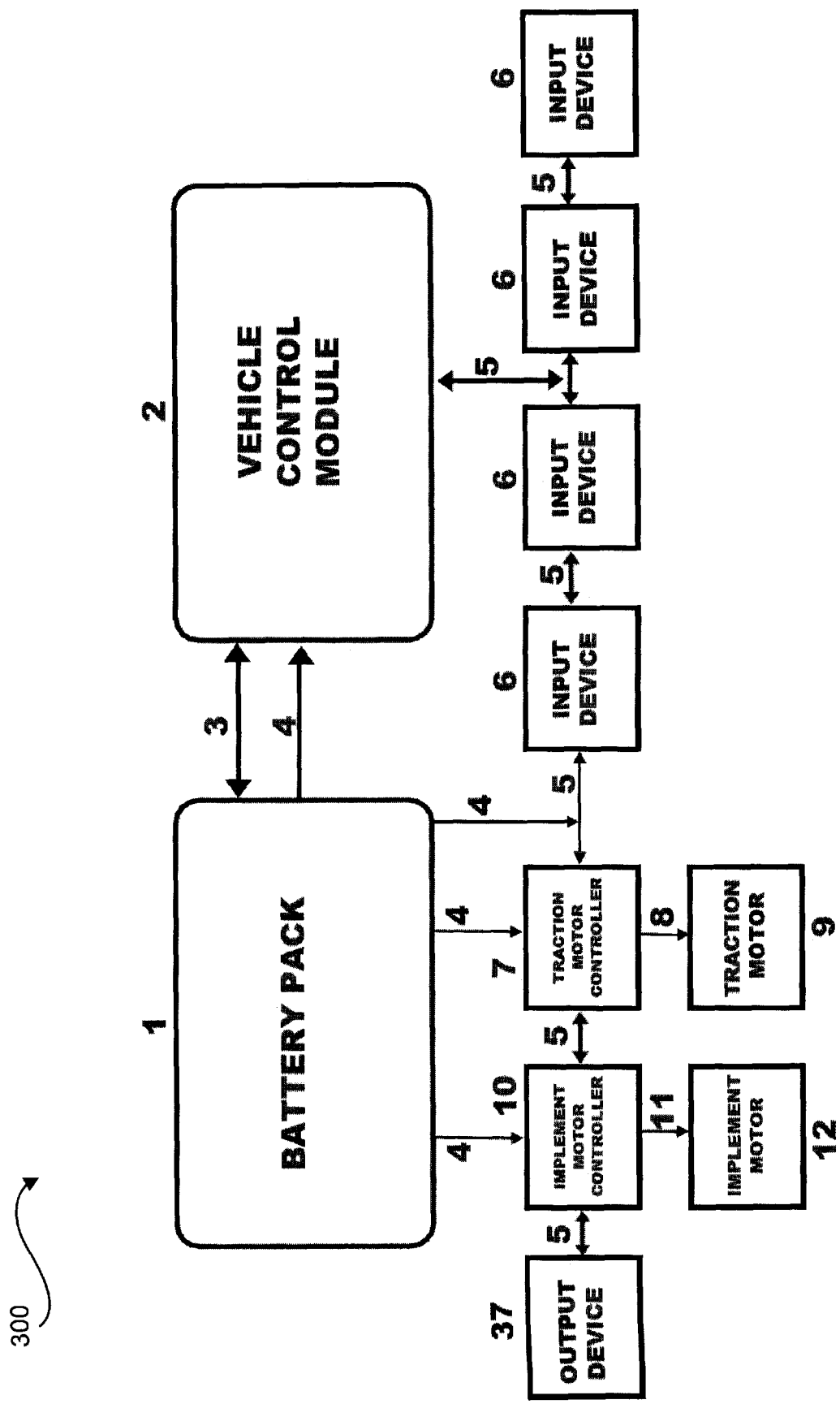
FIG. 3 shows a schematic representation of another example system for operating an electric vehicle, in accordance with a non-limiting implementation of the present specification.

Turning now to FIG. 3, a schematic representation is shown of an example system 300 for operating an electric vehicle. System 300 comprises a battery pack 1 to provide a source of steady state power to a Vehicle Control Module (VCM) 2 and all devices connected to the buses that are connected to it through the power distribution wires 4. The battery digitally transmits and receives messages to and from the VCM 2 on the Power Communication Network (PCN) Bus 3.

Multiple digital input devices 6 on the vehicle allow the operator to control the vehicle by the digital transmission of the inputs to the VCM 2 through the Vehicle Communication Network (VCN) Bus 5. Other digital input devices 6 may exist on the vehicle that act as a sensor that the physical operator may or may not interact with, but are configured to transmit digital input data to the VCM 2. In terms of functionality, the VCM and PCN and VCN buses of system 300 may be similar to the VCM and PCN and VCN buses of system 200 respectively.

A traction drive motor controller 7 is connected to the Vehicle Communication Network Bus 5 and configured to receive inputs from the VCM 2 and to transmit operation data to it. The traction drive motor controller 7 receives steady state power from the battery 1 through the power distribution wires 4. The traction drive motor controller provides power to the traction drive motor 9 through the power wires connected between them 8.

An implement drive motor controller 10 is connected to the Vehicle Communication Network (VCN) Bus 5 and configured to receive inputs from the VCM 2 and to transmit operation data to it. The implement drive motor controller receives steady state power from the battery 1 through the power distribution wires 4. The implement drive motor controller 10 provides power to the implement drive motor 12 through the power wires 11 connected between them.

An output device 37 may be connected to VCN Bus at any point that could drive other motors or show status of various other devices on the bus or decisions made by the VCM 2. In some examples, system 300 may comprise a portion of the control and communication system for a riding mower. In some such examples, the implement may comprise the cutting deck or blades of the mower. It is also contemplated that in some examples, system 300 may comprise a portion of the control and communication system for a utility electric vehicle other than a mower.

Figure 4:
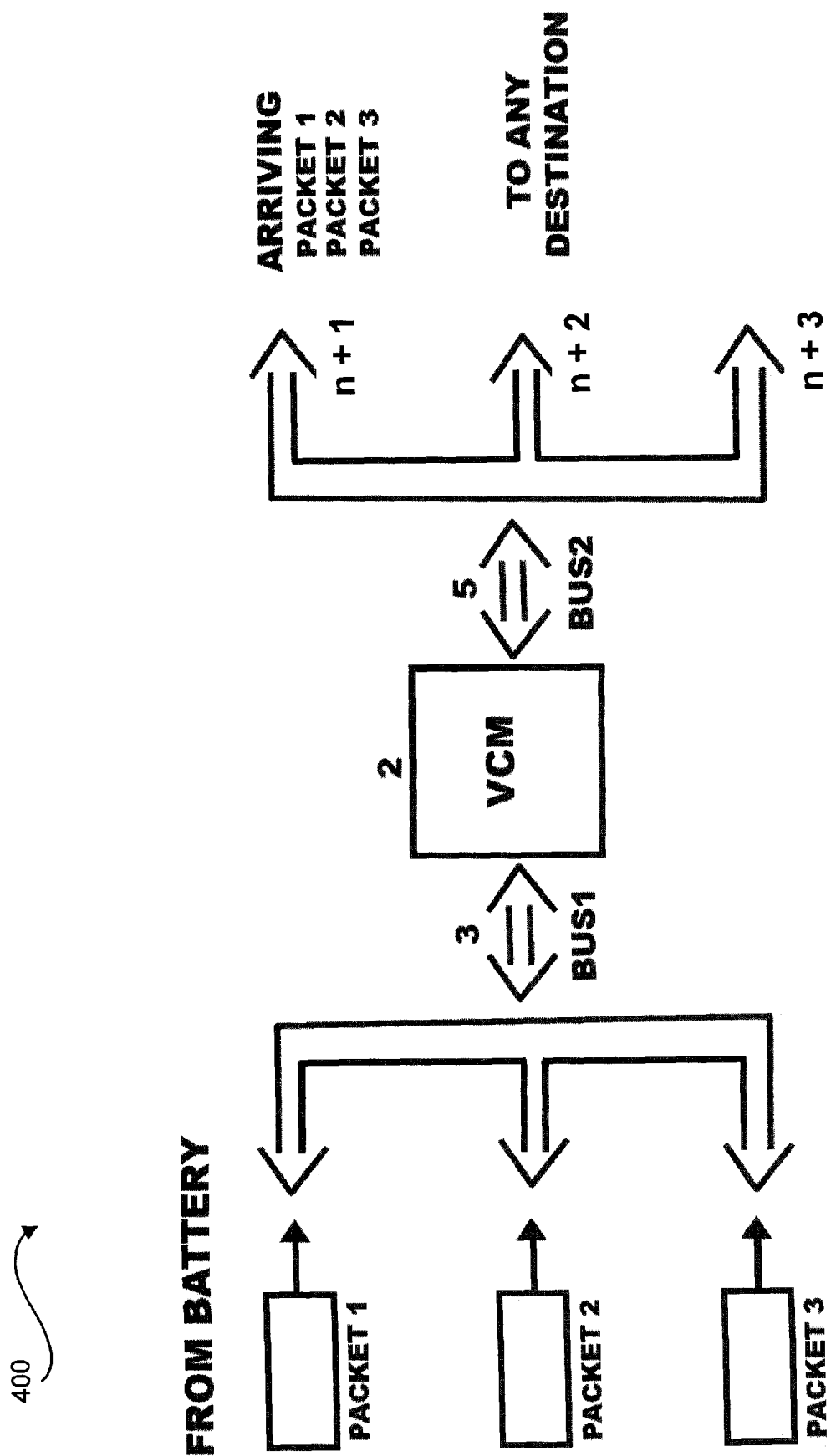
FIG. 4 shows a schematic representation of an example digital message packet flow in an example system for operating an electric vehicle, in accordance with a non-limiting implementation of the present specification.

FIG. 4 shows a schematic representation of an example digital message packet flow 400 in an example system for operating an electric vehicle. Such an example system may be system 200, 300 or another one of the systems described herein.

Data packets arrive from batteries on the Power Communication Network Bus 3 and are received by the Vehicle Control Module 2. The vehicle control module 2 uses those data packets to determine various things about the state of the batteries such as state of charge, temperature, available amperage, acceptable charging rates, and the like.

The Vehicle Control Module 2 may also send commands back to the batteries over the power communication network Bus 3. Such commands may include turning on or turning off the portions of a battery connected to the steady state power wires through solid state switches. The Vehicle control module 2 may send commands or receive data back through the vehicle control network Bus 5 to and from any node or component connected to the vehicle control network Bus 5. While FIG. 4 shows three messages from the battery being delivered to destination components via two buses and the VCM, it is contemplated that both the nature of the source and destination components, and the number of digital messages being exchanged, may be different than those shown in FIG. 4.

Figure 5:
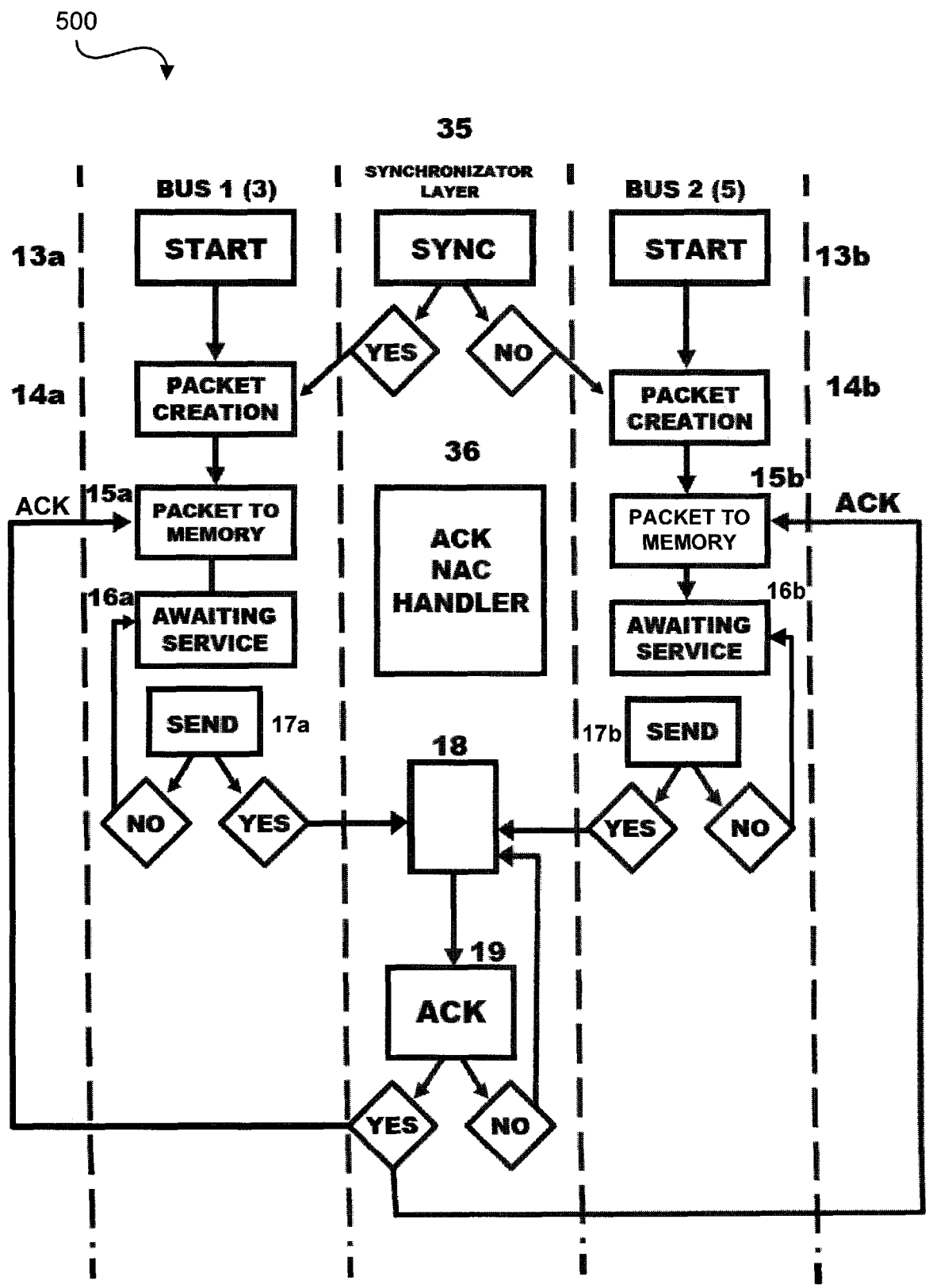
FIG. 5 shows a schematic representation of an example manner of coordinating digital message traffic by an example vehicle control module (VCM), in accordance with a non-limiting implementation of the present specification.

FIG. 5 shows a schematic representation of an example manner of coordinating digital message traffic by an example vehicle control module (VCM). In some examples, this VCM may comprise VCM 205, VCM 2, or another one of the VCM's described herein. FIG. 5 shows example features, decisions and interdependencies relating to coordination of digital message traffic over multiple buses. Flow diagram 500 shows three main parts; BUS.1 3, BUS.2 5 and the synchronization layer 35. In some examples, the synchronization layer and functionality may be implemented by a VCM, such as VCM 205, VCM 2, and the like.

BUS.1 and BUS.2 may be similar to each other; they may differ as to bus activity and information content. In some examples, BUS.1 and BUS.2 may comprise a PCN bus and a VCN bus respectively. BUS.1 and BUS.2 may be similar to the PCN and VCN buses described in relation to FIGS. 1-3. When the bus START 13*a* is enabled, data is gathered and a single or multiple packets created in PACKET CREATION 14*a*. START 13*b* may have a similar corresponding function. Both 14*a* and 14*b* are capable of simultaneous packet creation and moving the content to PACKET TO MEMORY 15*a* and 15*b* transfers. Packets may comprise data packets representing or containing candidate digital messages to be sent over one or more of the buses.

Under exemplary conditions, packets might be SEND 17*a*, 17*b* or held back by the AWAITING SERVICE 16*a*, 16*b* decision module. In some examples, that hold back could be due to traffic, other higher-level priorities, custom set-up, past packets continuously being labeled as not acknowledged (NAC), and the like. Packets (e.g. digital messages) that are to be sent are moved to a message queue 18. SEND 17*a*, 17*b* do not remove the packet being serviced but labels it as SEND, until ACK 19 comes back from the transmission layer as delivered. ACK 19 and its corresponding YES, NO fork services both BUS.1 3 and BUS.2 5. ACK NAC HANDLER 36 provides interrupts, interrupt service routines, and synchronization of packets from both busses. PACKET TO MEMORY 15a, 15b that received the YES from ACK 19 removes the packet from queue 18 as DELIVERED and moves the internal pointer to the next packet to be serviced. The scheme according to which messages are sent out of queue 18 may be FIFO, LIFO or a combination of both, which may be programmable in real time.

Once a target message of the candidate messages has been successfully transmitted, the YES from ACK 19 may also store an indication of the transmission of the target candidate message. In some examples, START 13a and START 13b may be independent per each bus 3 and 5. Moreover, in some examples, PACKET CREATION 14a and 14b may be capable of being identical, similar or carry no similarities while constructing packets. In some examples, AWAITING SERVICE 16a and 16b may be similar or identical in feature set to be predictable and synchronized to the ACK NAC HANDLER 36.

In flow diagram 500, the YES option in SYNC in synchronization layer 35 points to packet creation 14a within BUS.1. This illustrates an example where BUS.1 represents the PCN bus, and the VCM preferentially synchronizes with the PCN bus. It is also contemplated that in some examples BUS. 1 may be the VCN bus, or that synchronization layer 35 may have a different preference or priority for synchronization.

In some examples, to coordinate the digital message traffic over the PCN bus with the corresponding digital message traffic over the VCN bus the VCM may receive one or more candidate digital messages to be sent over one or both of the VCN and PCN buses. The VCM may then filter the candidate digital messages to generate a filtered subset of the candidate digital messages pertinent to a power component of the electric vehicle connected to the PCN bus. Then the VCM may transmit, or cause to be transmitted, one or more of the candidate digital messages in the filtered subset over the PCN bus.

In this manner, the traffic on the PCN bus may be limited to the messages that are pertinent to the power components connected to the PCN bus. Such pertinent messages may include messages generated by the power components, messages intended for the power components, or messages otherwise related or relevant to the power components. Limiting the traffic on the PCN bus in this way reduces the bandwidth utilization of the PCN bus, thereby reducing the likelihood of bandwidth shortages on the PCN bus. This filtering function may be similar to the corresponding function described in relation to method 100 and the other methods described herein.

Figure 6:
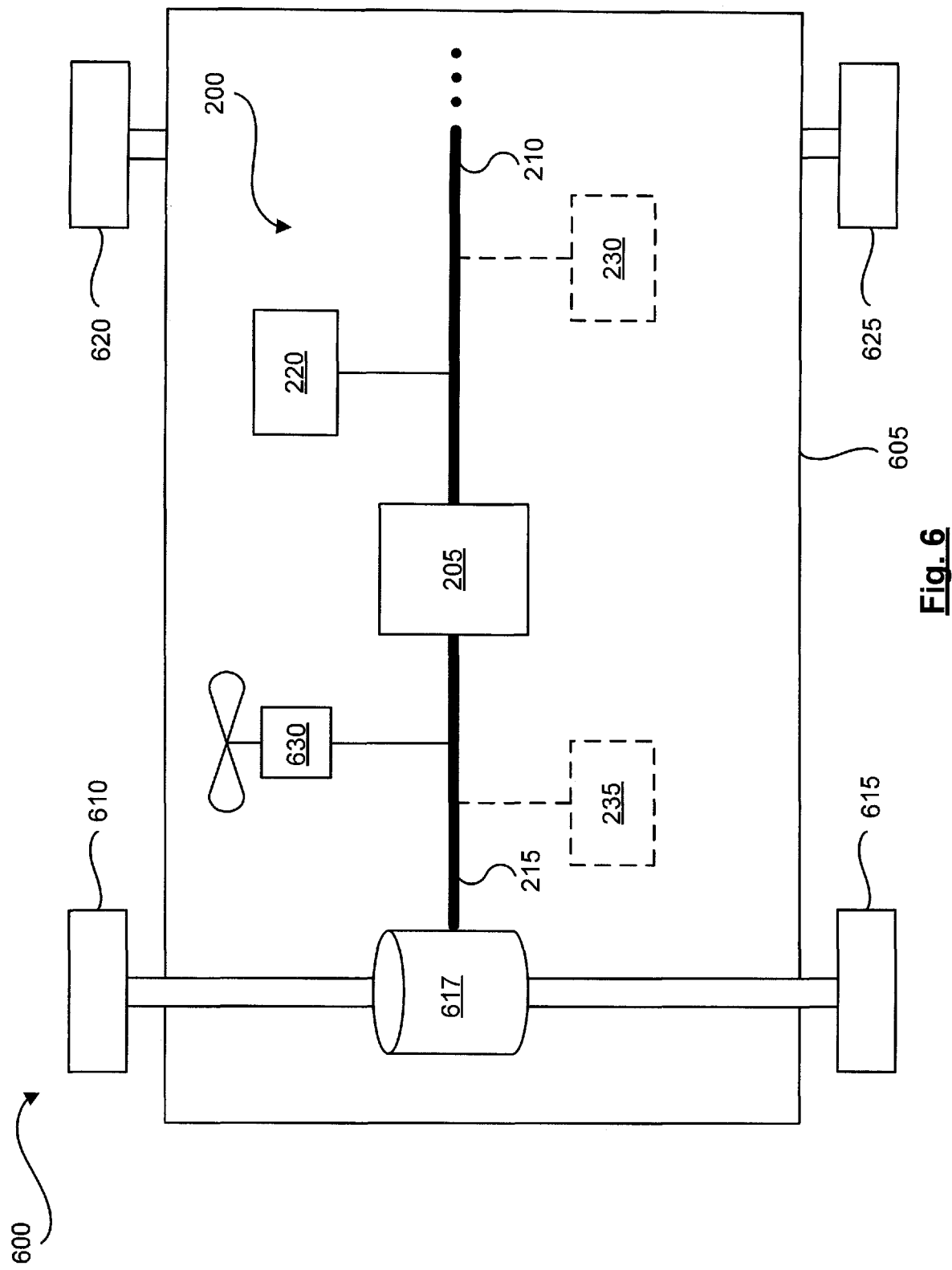
FIG. 6 shows a schematic representation of an example electric vehicle incorporating an example system for operating the electric vehicle, in accordance with a non-limiting implementation of the present specification.

Turning now to FIG. 6, a schematic representation is shown of an example electric vehicle 600, which is operated by system 200. Vehicle 600 comprises a chassis 605 and wheels 610, 615, 620, and 625. An electric motor 617 may be mechanically coupled to wheels 610 and 615 to power those wheels to move or drive vehicle 600. Vehicle 600 may also comprise a powered implement 630. In some such examples, vehicle 600 may comprise a riding mower, and implement 630 may comprise a cutting deck of the mower used for cutting grass and the like.

In some examples, in system 200 component 220 may be a battery, which sends digital messages over bus 210 to VCM 205 to provide information about the battery to the VCM. VCM 205, in turn, may generate and send digital messages to motor 617 and implement 630 based on the information from the battery. In some examples, component 230 may comprise a battery management system, or the like. Component 235 may comprise a motor controller, a digital input device, or the like. Motor 617 or implement 630 may take the place of, or be, component 225 (shown in FIG. 2, but not shown in FIG. 6).

It is also contemplated that in some examples, instead of or in addition to system 200, vehicle 600 may include or be operated by one or more of systems 300 and the other systems described herein.

In general, the examples described herein relate to electric communication networks for an electric utility vehicle. Moreover, some examples relate to network bus layouts for an electric utility vehicle containing a battery system, a vehicle control module with digital inputs and digital outputs that control independent drive wheels, and output devices. In some examples, network topography may be predefined or autonomously chosen by units attached to it.

Some of the examples described herein include a power distribution and vehicle control network for a utility vehicle. Some of the systems described include power distribution wires connected to all devices on the vehicle, a vehicle control module, various digital input devices, various motor controllers configured to control ground drive wheels, various motor controllers configured to implement motors, and a communication network that digitally communicates information about a battery or multiple batteries with a vehicle control module. The systems may also include a digital communication network that allows for communication between digital input devices and the vehicle control module and allows the transmission of digital output information to motor controllers for drive wheels and implement motors.

In some examples, the Vehicle Control Module accepts and responds to digital messages over two distinct network Buses. One allowing the Vehicle Control Module to understand the condition of the battery in an electric utility vehicle, and commands it to perform certain functions as needed to run the vehicle. The second allowing the Vehicle Control Module to receive inputs from the operator through digital input devices or other input devices on the Vehicle Communication Network Bus to make decisions about the needed control of various motor controllers that are also connected to the Vehicle Communication Network Bus. In some examples, each of the PCN and VCN buses may have additional components attached thereto, such as expansion nodes, modules, and custom features in software, hardware and combination of both are contemplated and added to each bus as per an operator's changing requirements.

In some examples, the Vehicle Control Module may accept and respond to digital messages over two distinct network buses. Each bus may have its own baud rate that is independent of the other one, but under certain conditions can be configured to be the same. Asynchronous or synchronous modes are available to be configured on power-up or changed in real time.

In addition, in some examples, the general aspect of the power distribution and drive control system for a utility electric vehicle may comprise a microcontroller described as the Vehicle Control Module and its ability to: on one communication bus communicate with a battery system and determine from that system the available energy and the state of the battery system, along with the ability to control the battery power output, and on a second communication bus receive digital input from digital input devices and control motor controllers that are coupled to either vehicle drive wheels or implements, and other output devices such as displays, horns, lights, and the like.

In some examples, the Vehicle Control module may be configured electronically to make choices about how the output devices connected to the Vehicle Communication Network Bus are controlled. This control method may be by direct operator input such a turning on a light when the operator turns on a digitally configured switch. It may be more complex by taking into account desired wheel drive torque input from an operator-controlled throttle input on the Vehicle Communication Network Bus and actual power available reported from a battery pack on the Power Communication Network Bus to determine possible wheel torque and ramp rate to achieve desired wheel torque. It may be autonomous such as considering inputs from sensors that the operator does not directly interact with, such as an accelerometer, and the like.

Some features and aspects of the present specification may be as follows: a power distribution and drive control system for an electric utility vehicle including: a power communication network bus from a battery to a vehicle control module; a vehicle control module comprising of a controller and a memory, that accepts digital input signals and outputs digital commands, and is enabled to control the power output and charging of a battery over the power communication network bus; a digital vehicle communication network bus coupled to the vehicle control module, the vehicle control module configured to receive digital input from digital input devices and output digital commands to digital output devices; a digital output device that is a motor controller coupled to the vehicle communication network bus and commanding control of a motor that powers a drive wheel to a desired torque and direction of rotation; a digital output device that is a motor controller coupled to the vehicle communication bus and commanding control of a motor that powers an implement; and a plurality of digital input devices coupled to the vehicle communication bus.

In some examples, multiple digital output devices that are motor controllers may be coupled to the vehicle communication bus, and configured to control multiple drive wheels; and multiple digital output devices that are motor controllers may be coupled to the vehicle communication Bus, and configured to control multiple implements.

In some examples, the systems described herein may provide a duality of digital buses providing de-centralized autonomy for each bus.

In some examples, the duality of digital buses providing synchronization of detach packets for each bus to manage latency, packet's configuration; for example: coordinating a full duplex packet stream profiles, recovery protocol, clock tree configuration, and the like.

In some examples, the duality of digital buses may provide the ability for the transmitting queue to preemptively interrupt the receiving queue, based for example on an increase, decrease, or lack of information being shared; for example, primary or/and secondary bus payload adjustments to manage power consumption, cyclic redundancy check (CRC) error checks, and the like.

In some examples, the power communication bus may be coupled to multiple batteries. The bus being coupled to batteries may also be described as the bus being directly or indirectly connected to the batteries.

In some examples, the vehicle control module may contain an accelerometer.

In some examples, the plurality of digital input devices may include a key switch with a removable key.

In some examples, the plurality of digital input devices may include an operator presence device.

In some examples, the plurality of digital input devices may include a steering control controlled by the operator that transmits desired rotation of a steering tire about a substantially vertical axis.

In some examples, the plurality of digital input devices may include a vehicle speed control, controlled by the operator and configured to transmit the desired drive torque and rotation direction of a drive wheel.

In some examples, the plurality of digital input devices may include a rotary operator input device with discrete positions.

In some examples, the plurality of digital input devices may include a locking plunger switch known as a (Power Take Off) PTO plunger switch.

In some examples, the plurality of digital input devices may include a keypad configured to accept operator inputs.

In some examples, the plurality of digital input devices may include a rocker switch.

In some examples, the plurality of digital input devices may include a camera.

In some examples, the plurality of digital input devices may include an accelerometer.

In some examples, the plurality of digital input devices may include a pressure sensitive sensor.

In some examples, the plurality of digital input devices may include a radar sensor.

In some examples, the plurality of digital input devices may include a steering wheel operable by an operator of the electric vehicle.

In some examples, the plurality of digital input devices may include a joystick.

In some examples, the plurality of digital input devices may include one or more of a custom module, functional mezzanine boards, and other items used or future usage on vehicle's architecture.

In some examples, the operator presence device may comprise an accelerometer coupled to the operator platform, and the vehicle control module may be configured to differentially compare the seat acceleration to the vehicle control module acceleration and determine if an operator is still seated while the utility electric vehicle is in motion.

In some examples, the Vehicle Control Module may receive data from the digital input device and control the drive wheel controllers to command differential rates of drive wheel rotation and torque to cause the utility vehicle to yaw about a vehicle vertical Z axis at a desired rate of rotation.

In some examples, the Vehicle Control Module may be configured to accept data from the digital input device that is attached to the implement and the Vehicle Control Module may be configured to command the drive wheel motor controller to slow the vehicle if a vertical acceleration rate is exceeded by the digital input device. In some such examples, the vehicle may be a mower and the implement may be the cutting deck of the mower. If the vertical acceleration of the deck is above a threshold, i.e. if the deck is bouncing or jumping, such bouncing or jumping may cause uneven cutting of the grass. To reduce or prevent this unevenness, the forward motion of the vehicle may be slowed down to reduce the deck bouncing or jumping.

In some examples, the utility vehicle implement may be a lawnmower.

In some examples, the utility vehicle implement may be a snow thrower.

In some examples, the utility vehicle implement may be a sprayer.

In some examples, the utility vehicle implement may be a spreader.

In some examples, the utility vehicle implement may be a plow.

In some examples, the utility vehicle implement may be a tiller.

In some examples, the utility vehicle implement may be a powered brush.

In some examples, the utility vehicle implement may be a powered thatcher.

In some examples, the utility vehicle implement may be a seeder.

In some examples, the utility vehicle implement may be a trencher.

In some examples, the utility vehicle implement may be a blower.

In some examples, the utility vehicle implement may be a vacuum.

In some examples, the utility vehicle implement may be a moving object generally described as an industrial robot, utility robot, personal assistant robot, autonomous delivery unit, search and rescue vehicle, and the like.

In the drawings shown in the figures, the portions of the systems depicted are those portions that are related to the features or functions described herein. It is contemplated that the systems may have additional components which may be used for, or needed to, operate an electric vehicle.

In some examples, system 200, 300, and the other systems described herein may perform method 100 and the other methods described herein. It is also contemplated that in some examples, the systems described herein may have functions or perform methods other than method 100 and the other methods described herein. Moreover, in some examples, method 100 and the other methods described herein may be performed by system 200, 300, and the other systems described herein. It is also contemplated that in some examples, method 100 and the other methods described herein may be performed by systems other than the systems described herein. In addition, in some examples, each of the methods and systems described herein may have some or all of the features and functions described in relation to any one or more of the other methods and systems described herein.

It should be recognized that features and aspects of the various examples provided herein may be combined into further examples that also fall within the scope of the present disclosure.

The invention claimed is:

1. A method of operating an electric vehicle, the method comprising:
generating a first digital message at a source component of the electric vehicle, the source component connected to a first bus comprising one of a Power Communication Network bus (PCN bus) and a Vehicle Communication Network bus (VCN bus) of the electric vehicle, the PCN and VCN buses each connected to a Vehicle Control Module (VCM) of the electric vehicle;
transmitting the first digital message from the source component to the VCM over the first bus;
generating at the VCM a second digital message based on the first digital message;
transmitting the second digital message from the VCM to a destination component of the electric vehicle, the destination component connected to a second bus comprising one of the PCN and VCN buses;
receiving at the VCM one of more candidate digital messages to be sent over one or both of the VCN bus and the PCN bus;
filtering at the VCM the candidate digital messages to generate a filtered subset of the candidate digital messages pertinent to a power component of the electric vehicle connected to the PCN bus; and
transmitting one or more of the candidate digital messages in the filtered subset over the PCN bus.

2. The method of claim 1, wherein the PCN bus and the VCN bus have different baud rates.

3. The method of claim 1, wherein:
the source component is connected to the first bus comprising one of the PCN bus and the VCN bus; and
the destination component is connected to the second bus comprising the other one of the PCN bus and the VCN bus.

4. The method of claim 1, wherein a battery is connected to the PCN bus.

5. The method of claim 4, wherein:
the first bus comprises the PCN bus;
the source component comprises the battery; and
the generating the first digital message at the source component comprises generating the first digital message at the battery.

6. The method of claim 1, wherein a digital input device associated with the electric vehicle is connected to the VCN bus.

7. The method of claim 6, wherein an electric actuator controller of the electric vehicle is connected to the VCN bus.

8. The method of claim 7, wherein:
the destination component comprises one or more of the digital input device and the electric actuator controller; and
the transmitting the second digital message to the destination component comprises transmitting the second digital message to one or more of the digital input device and the electric actuator controller.

9. The method of claim 1, further comprising:
synchronizing a baud rate of the VCM with a corresponding baud rate of the PCN bus.

10. The method of claim 1, further comprising:
storing the candidate digital messages at the VCM in a message queue.

11. The method of claim 10, further comprising:
transmitting the candidate digital messages according to a scheme out of the message queue over one or both of the VCN bus and the PCN bus, the scheme comprising one of first-in-first-out (FIFO) and last-in-first-out (LIFO).

12. The method of claim 11, further comprising:
receiving at the VCM an acknowledgement of successful transmission of a target candidate digital message of the candidate digital messages; and
removing the target candidate digital message from the message queue in response to receiving the acknowledgement.

13. The method of claim 12, further comprising:
storing at the VCM an indication of transmission of the target candidate digital message.

14. A system for operating an electric vehicle, the system comprising:
a Vehicle Control Module (VCM) of the electric vehicle;
a Power Communication Network bus (PCN bus) connected to the VCM;

a Vehicle Communication Network bus (VCN bus) connected to the VCM;

a source component of the electric vehicle connected to a first bus comprising one of the PCN and VCN buses, the source component to generate a first digital message, the first bus to transmit the first digital message to the VCM;

the VCM to generate a second digital message based on the first digital message;

a destination component of the electric vehicle connected to a second bus comprising one of the PCN and VCN buses, the second bus to transmit the second digital message from the VCM to the destination component;

wherein the VCM is configured to:

receive one or more candidate digital messages to be sent over one or both of the VCN bus and the PCN bus;

filter the candidate digital messages to generate a filtered subset of the candidate digital messages petinent to a power component of the electric vehicle connected to the PCN bus; and transmit one or more of the candidate digital messages in the filtered subset over the PCN bus.

15. The system of claim 14, wherein the PCN bus and the VCN bus have different baud rates.

16. The system of claim 14, wherein:

the source component is connected to the first bus comprising one of the PCN bus and the VCN bus; and the destination component is connected to the second bus comprising the other one of the PCN bus and the VCN bus.

17. The system of claim 14, further comprising a battery of the electric vehicle connected to the PCN bus.

18. The system of claim 17, wherein:

the first bus comprises the PCN bus;

the source component comprises the battery; and the battery is to generate the first digital message.

19. The system of claim 14, further comprising a digital input device associated with the electric vehicle connected to the VCN bus.

20. The system of claim 19, further comprising an electric actuator controller of the electric vehicle connected to the VCN bus.

21. The system of claim 20, wherein:

the destination component comprises one or more of the digital input device and the electric actuator controller.

22. The system of claim 14, wherein the VCM is further configured to:

synchronize a baud rate of the VCM with a corresponding baud rate of the PCN bus.

23. The system of claim 14, wherein the VCM is further configured to:

store the candidate digital messages at the VCM in a message queue.

24. The system of claim 23, wherein the VCM is further configured to:

transmit the candidate digital messages according to a scheme out of the message queue over one or both of the VCN bus and the PCN bus, the scheme comprising one of first-in-first-out (FIFO) and last-in-first-out (LIFO).

25. The system of claim 24, wherein the VCM is further configured to:

receive an acknowledgement of successful transmission of a target candidate digital message of the candidate digital messages; and remove the target candidate digital message from the message queue in response to receiving the acknowledgement.

26. The system of claim 25, wherein the VCM is further configured to:

store at the VCM an indication of transmission of the target candidate digital message.

* * * * *